United States Patent
Yoshida

(10) Patent No.: US 9,927,628 B2
(45) Date of Patent: Mar. 27, 2018

(54) IMAGE DISPLAY APPARATUS

(71) Applicant: NATIONAL INSTITUTE OF INFORMATION AND COMMUNICATIONS TECHNOLOGY, Tokyo (JP)

(72) Inventor: Shunsuke Yoshida, Koganei (JP)

(73) Assignee: NATIONAL INSTITUTE OF INFORMATION AND COMMUNICATIONS TECHNOLOGY, Tokyo (JP)

(*) Notice: Subject to any disclaimer, the term of this patent is extended or adjusted under 35 U.S.C. 154(b) by 0 days.

(21) Appl. No.: 15/326,898

(22) PCT Filed: Jun. 15, 2015

(86) PCT No.: PCT/JP2015/002988
§ 371 (c)(1),
(2) Date: Jan. 17, 2017

(87) PCT Pub. No.: WO2016/009588
PCT Pub. Date: Jan. 21, 2016

(65) Prior Publication Data
US 2017/0205634 A1    Jul. 20, 2017

(30) Foreign Application Priority Data

Jul. 18, 2014 (JP) .................... 2014-147858

(51) Int. Cl.
*G03B 21/28* (2006.01)
*G02B 5/12* (2006.01)
(Continued)

(52) U.S. Cl.
CPC ....... *G02B 27/2271* (2013.01); *G02B 5/0284* (2013.01); *G02B 5/128* (2013.01);
(Continued)

(58) Field of Classification Search
CPC .......... G02B 5/128; G02B 5/136; G02B 5/12; G02B 5/124; H04N 13/445;
(Continued)

(56) References Cited

U.S. PATENT DOCUMENTS 6,665,100 B1 * 12/2003 Klug ................. G02B 5/32
359/15
8,360,581 B2 * 1/2013 Yabui .................. G02B 5/124
353/7
(Continued)

FOREIGN PATENT DOCUMENTS

JP    2000-275755 A    10/2000
JP    2005-55822 A     3/2005
(Continued)

OTHER PUBLICATIONS

International Search Report dated Aug. 18, 2015, issued in counterpart International Application No. PCT/JP2015/002988 (2 pages).

*Primary Examiner* — William C Dowling
(74) *Attorney, Agent, or Firm* — Westerman, Hattori, Daniels & Adrian, LLP

(57) ABSTRACT

An image display apparatus includes a reflector and a plurality of projectors. The reflector is provided to cover a field. A plurality of viewing regions are set in an auditorium to be arranged in a circumferential direction of the field. The plurality of projectors are provided to respectively correspond to the plurality of these viewing regions. Each projector emits a light ray group including a plurality of light rays towards the reflector. The reflector includes a plurality of retroreflective elements, and reflects and diffuses the light ray group emitted from each projector towards a corresponding viewing region.

6 Claims, 10 Drawing Sheets

(51) Int. Cl.
*G02B 27/22* (2018.01)
*G02B 5/02* (2006.01)
*G02B 5/128* (2006.01)
*H04N 13/04* (2006.01)
*H04N 9/31* (2006.01)
*G03B 21/602* (2014.01)

(52) U.S. Cl.
CPC ......... *G03B 21/602* (2013.01); *H04N 9/3147* (2013.01); *H04N 13/0447* (2013.01)

(58) Field of Classification Search
CPC ........... H04N 13/04447; H04N 9/3147; H04N 13/045; H04N 13/044744; G03B 21/28
See application file for complete search history.

(56) References Cited

U.S. PATENT DOCUMENTS 9,244,339 B2 * 1/2016 Wang ................. H04N 13/0429
9,465,283 B2 * 10/2016 Ferren ................... G03B 21/56
2008/0036969 A1 2/2008 Otsuka et al.
2008/0297593 A1 12/2008 Debevec et al.
2009/0290126 A1 11/2009 Yabui et al.
2010/0259599 A1 10/2010 Otsuka et al.
2013/0286481 A1 * 10/2013 Mimura ................. G02B 5/128
359/542
2014/0022511 A1 * 1/2014 Kuo ..................... G02B 5/0221
353/10
2014/0327748 A1 11/2014 Debevec et al.

FOREIGN PATENT DOCUMENTS

| | | |
|---|---|---|
| JP | 2006-11136 A | 1/2006 |
| JP | 2008-249897 A | 10/2008 |
| JP | 2010-2894 A | 1/2010 |
| JP | 2013-210592 A | 10/2013 |
| WO | 2006/027855 A1 | 3/2006 |

* cited by examiner

F I G. 7
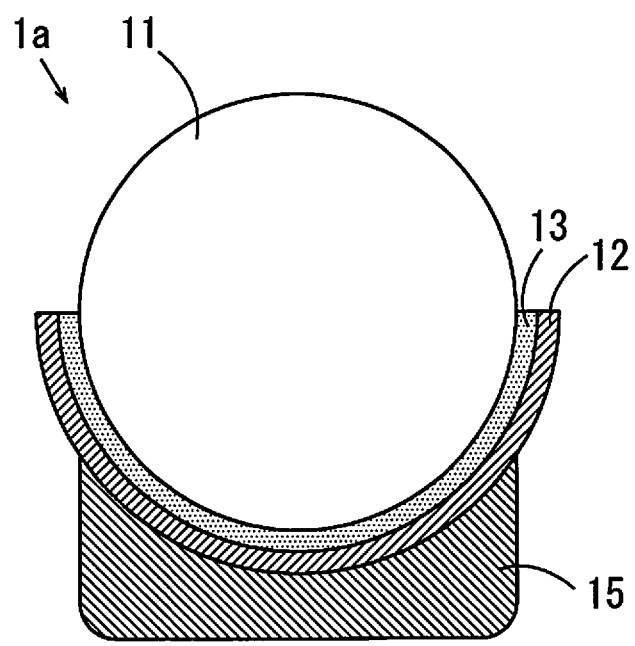

IMAGE DISPLAY APPARATUS

TECHNICAL FIELD

The present invention relates to an image display apparatus that displays an image.

BACKGROUND ART

Public viewing for viewing an event such as a soccer match at a place different from an actual venue is held. At general public viewing, video of an event to be viewed is displayed on a large-size screen, and a number of viewers watch the video. However, because all viewers watch the same two-dimensional video, a sense of realism is markedly reduced as compared to the case where the viewers watch the event at the actual venue.

On the other hand, there is a technology for enabling viewers to view different images depending on a position of each viewer. For example, in a projection display system described in Patent Document 1, a screen is made of a retroreflective material. Further, a plurality of image projection means are prepared to respectively correspond to a plurality of viewers. The image projection means is attached to a head of each viewer such that a projection direction of each image projection means coincides with a direction of a line-of-sight of the corresponding viewer. In this case, the image displayed on the screen by each image projection means is viewed only by the corresponding viewer. Therefore, the plurality of viewers can respectively view different images on the common screen.

[Patent Document 1] JP 2005-55822 A

SUMMARY OF INVENTION

Technical Problem

In the projection display system described in the above-mentioned Patent Document 1, because one viewer views an image displayed by one image projection means, in the case where a plurality of viewers watch an image of a sports event, for example, the number of image projection means needs to match the number of viewers, and a cost increases. Further, because it is necessary for each viewer to wear the image projection means on the head, a physical burden imposed on the viewer is large.

An object of the present invention is to provide an image display apparatus that enables different images to be viewed from a plurality of viewing regions and a plurality of viewers in each viewing region to view a common image with a physical burden not imposed on each viewer while an increase in cost is inhibited.

Solution to Problem (1) An image display apparatus according to the present invention that displays images, which are respectively viewable from a plurality of viewing regions set in advance, on an image display surface includes a plurality of light ray generators that are provided to respectively correspond to the plurality of viewing regions and each emit a light ray group including a plurality of light rays towards the image display surface, a reflector that is provided at the image display surface and reflects the plurality of light ray groups emitted from the plurality of light ray generators; and a controller that controls the plurality of light ray generators, wherein the reflector reflects a light ray group emitted from each light ray generator towards a corresponding viewing region such that a plurality of viewers in each viewing region are capable of simultaneously viewing an image displayed on the image display surface, and the controller controls the plurality of light ray generators such that different images are respectively viewed from the plurality of viewing regions.

In this image display apparatus, the plurality of light ray groups are respectively emitted towards the image display surface from the plurality of light ray generators. A light ray group emitted from each light ray generator is reflected by the reflector provided at the image display surface towards the corresponding viewing region. Thus, an image, which can be viewed from each viewing region, is displayed on the image display surface.

In this case, the reflector reflects each light ray group such that the plurality of viewers in each viewing region can simultaneously view the common image. Therefore, the necessary number of light ray generators is smaller than the number of viewers. Further, it is not necessary for each viewer to wear the light ray generator.

Further, the plurality of light ray generators are controlled such that different images are respectively viewed from the plurality of viewing regions. Thus, an image corresponding to the viewing region can be viewed from each viewing region.

As a result, a physical burden is not imposed on each viewer, an increase in cost is inhibited, different images can be viewed from the plurality of viewing regions, and a plurality of viewers in each viewing region can view a common image.

(2) The reflector may include a retroreflective material, and the image display apparatus may further include a diffuser that diffuses each light ray reflected by the retroreflective material in a constant angular range.

In this case, the light ray group emitted from each light ray generator is reflected by the retroreflective material and diffused by the diffuser and returns to the corresponding viewing region. Thus, the plurality of viewers in each viewing region can simultaneously view the common image with a simple configuration.

(3) The retroreflective material may include a plurality of retroreflective elements, which are arranged on the image display surface and respectively have reflection surfaces.

In this case, the plurality of retroreflective elements can be independently and respectively arranged, or at least part of the plurality of retroreflective elements can be integrated as a module. Thus, the retroreflective material can be easily disposed on the wide image display surface.

(4) The reflector may include a reflection surface that reflects the plurality of light ray groups emitted from the plurality of light ray generators, and a lens that collects the plurality of light ray groups reflected by the reflection surface in respective corresponding viewing regions.

In this case, the light ray group emitted from each light ray generator can be led to the corresponding viewing region with a simple configuration. Further, in the case where the Fresnel lens is used as a lens, it is possible to easily dispose the Fresnel lens on the image display surface by dividing the Fresnel lens into a plurality of portions.

(5) The different images may include a plurality of two-dimensional images corresponding to the case where common three-dimensional content is viewed from the plurality of respective viewing regions.

In this case, the common three-dimensional content can be viewed from each viewing region in a direction corresponding to the viewing region.

(6) The plurality of viewing regions may be set in an auditorium of a stadium, the image display surface may be a horizontal field of the stadium and the common three-dimensional content may be a subject to be viewed from surroundings by a number of persons.

In this case, the subject three-dimensional content (a soccer match, for example) for the public viewing can be virtually presented on the field of the stadium, and the three-dimensional content can be viewed from the auditorium of the stadium. Thus, the public viewing can be held while the viewers feel a high sense of realism.

(7) A diffuser may include a plurality of diffusion elements provided to respectively correspond to the plurality of retroreflective elements.

In this case, the light ray reflected by each retroreflective element is diffused by the corresponding diffusion element. Thus, the plurality of viewers in each viewing region can simultaneously view the common image with a simple configuration.

(8) The plurality of retroreflective elements may be respectively and independently arranged. In this case, the plurality of retroreflective elements are laid by being scattered on the image display surface. Thus, the plurality of retroreflective elements can be easily disposed.

(9) At least part of the plurality of retroreflective elements may be integrated as a module.

In this case, it is possible to easily dispose the plurality of retroreflective elements by disposing one or a plurality of modules on the image display surface.

(10) The reflector and the diffuser may reflect and diffuse the light ray group emitted from each light ray generator such that light rays emitted from a plurality of light ray generators corresponding to different viewing regions are not directed towards the same viewing region.

In this case, the light rays emitted from the plurality of light ray generators corresponding to the different viewing regions are prevented from being viewed from the same viewing region. Thus, the image viewed from each viewing region is prevented from being unclear.

(11) The diffuser may be configured such that an angular range of diffusion of light in a vertical direction and an angular range of diffusion of light in a horizontal direction are different from each other.

In this case, even in the case where an angular range of each viewing region in the vertical direction and an angular range of each viewing region in the horizontal direction are different from each other, each light ray emitted from each light ray generator can be led to the entire corresponding viewing region. Thus, an image corresponding to the viewing region can be viewed from each entire viewing region.

(12) The controller may control the plurality of light ray generators such that images on which different pieces of additional information are respectively displayed in a superimposed manner are viewed from a plurality of viewing regions. In this case, viewers in each viewing region can recognize the piece of additional information corresponding to their viewing region.

(13) The image display apparatus may further include an audio device that generates different sound for the plurality of viewing region. In this case, viewers in each viewing region can hear the sound corresponding to their viewing region.

(14) Each retroreflective element may further include a weight for adjusting an attitude. In this case, the attitude of each retroreflective element is naturally adjusted by the weight. Thus, the plurality of retroreflective elements can be easily disposed on the image display surface in an appropriate attitude.

Advantageous Effects of Invention

The present invention enables different images to be viewed from a plurality of viewing regions and a plurality of viewers in each of viewing region to view a common image with a physical burden not imposed on each viewer while an increase in cost is inhibited.

BRIEF DESCRIPTION OF DRAWINGS

FIG. 7 is a schematic cross sectional view showing yet another example of the retroreflective element.

DESCRIPTION OF EMBODIMENTS

An image display apparatus according to embodiments of the present invention will be described below with reference to drawings.

[1] First Embodiment (1) Configuration

Figure 1:
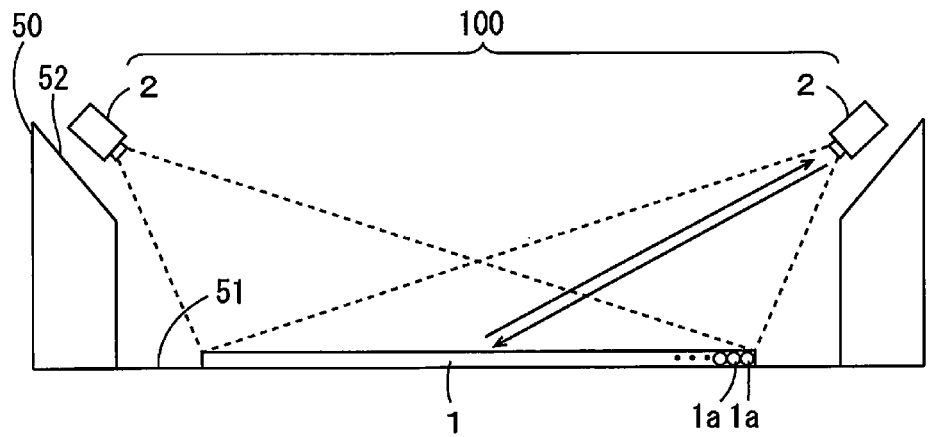
FIG. 1 is a schematic side view for explaining a configuration of an image display apparatus according to a first embodiment.
Figure 2:
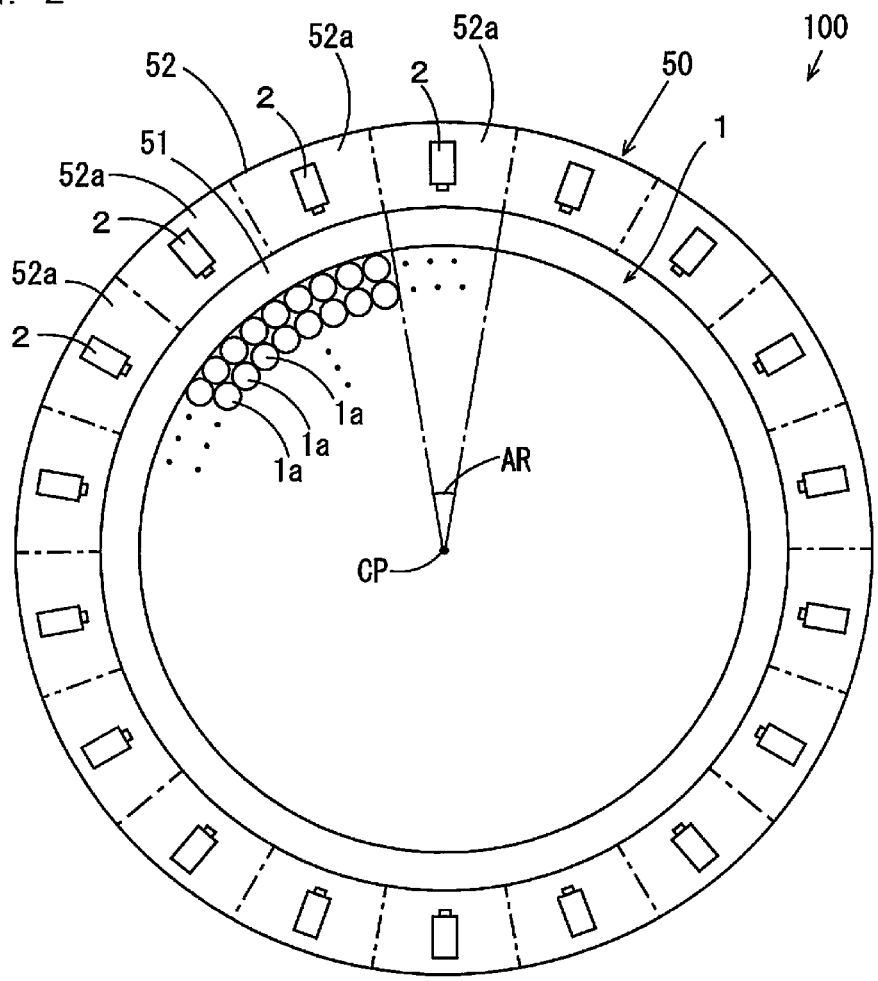
FIG. 2 is a schematic plan view for explaining the configuration of the image display apparatus according to the first embodiment.

FIGS. 1 and 2 are a schematic side view and a schematic plan view for explaining a configuration of the image display apparatus according to the first embodiment. As shown in FIGS. 1 and 2, the image display apparatus 100 according to the present embodiment is provided in a stadium 50 such as a baseball stadium or a soccer stadium. The stadium 50 of FIGS. 1 and 2 has a circular field 51. An annular auditorium 52 is provided at a position further outward and obliquely upward than the field 51 to surround the field 51. The auditorium 52 holds a plurality of viewers.

The image display apparatus 100 includes a reflector 1 and a plurality of projectors 2. In the present embodiment, the reflector 1 is made of a retroreflective material and provided to cover the field 51. The plurality of projectors 2 are provided over the auditorium 52 to surround the field 51.

In the auditorium 52, a plurality of viewing regions 52*a* are set to be arranged in a circumferential direction of the field 51. The plurality of projectors 2 are provided to respectively correspond to the plurality of these viewing regions 52*a*. In the present example, 18 viewing regions 52*a* are set around a center CP of the field 51 at angular intervals of a constant angle AR (20 degrees, for example). A corresponding projector 2 is provided at a center portion of each viewing region 52*a*. In this case, 18 projectors 2 are provided at intervals of the angle AR around the center CP of the field 51.

Each projector 2 emits a light ray group including a plurality of light rays towards the reflector 1. Each light ray group shows an image, and each light ray is equivalent to a pixel of the image. The reflector 1 includes a plurality of retroreflective elements 1*a*, and reflects and diffuses the light ray group emitted from each projector 2 towards each corresponding viewing region 52*a*. Details of the retroreflective element 1*a* will be described below.

Each projector 2 includes a projection system including a light source, a spatial light modulator, a plurality of lenses and an optical element, for example. As the spatial light modulator, a DMD (Digital Micromirror Device), an LCD (Liquid Crystal Display) or an LCOS (Liquid Crystal on Silicon) is used, for example. Alternatively, a laser projector including a laser light source and an MEMS (Micro Electro Mechanical Systems) mirror may be used.

(2) Retroreflective Element

Figure 3:
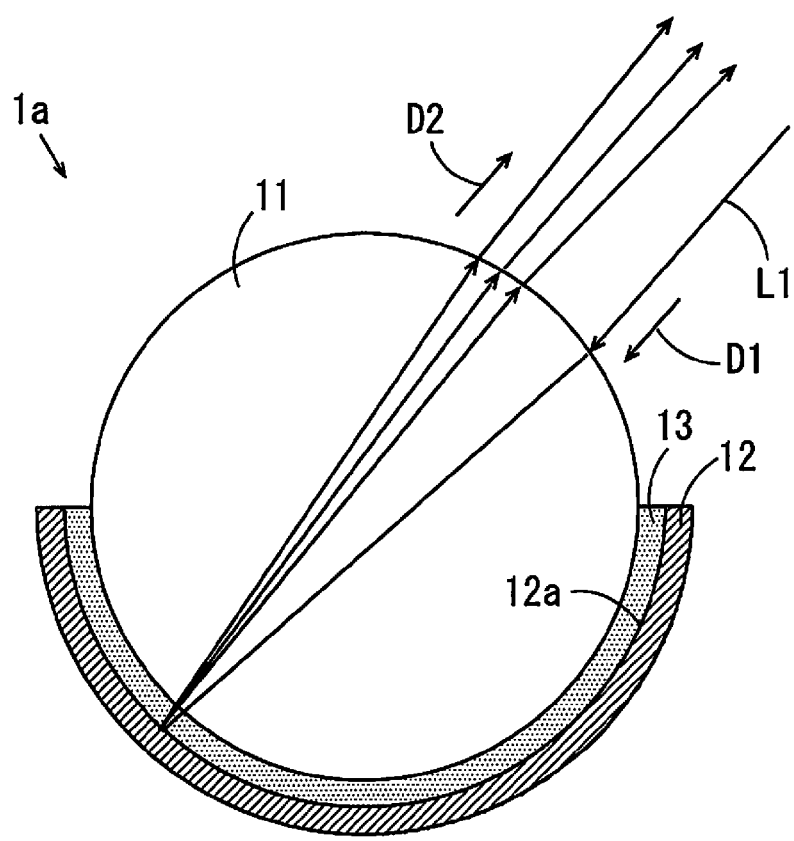
FIG. 3 is a schematic cross sectional view showing a specific configuration of a retroreflective element.

FIG. 3 is a schematic cross sectional view showing a specific configuration of the retroreflective element 1*a*. The retroreflective element 1*a* of FIG. 3 is spherical. The retroreflective element 1*a* includes a spherical lens 11 and a reflection layer 12. The reflection layer 12 is provided to cover a lower region of an outer surface of the spherical lens 11. The reflection layer 12 has a hemispherical reflection surface 12*a* facing the outer surface of the spherical lens 11. A diffusion layer 13 is disposed between the reflection surface 12*a* of the reflector layer 12 and the outer surface of the spherical lens 11. The spherical lens 11 has a function of collecting incident parallel light on a spherical surface inside of a sphere.

The diffusion layer 13 may be constituted by small components having a cyclic lens shape or a noncyclic irregular shape that are provided on a surface of the spherical lens 11 or the reflection surface 12*a* of the reflection layer 12, or may be constituted by a holographic sheet being attached to the surface of the spherical lens 11 or the reflection surface 12*a* of the reflection layer 12. Further, the diffusion layer 13 may be constituted by a resin layer including a small light diffusion material. The small light diffusion material may be oval or in a fiber-form, for example.

An upper region of the outer surface of the spherical lens 11 is exposed. Because each projector 2 of FIG. 1 is disposed at a position obliquely further upward than the retroreflective element 1*a*, a light ray L1 emitted from each projector 2 arrives from a position obliquely further upward than the retroreflective element 1*a* and is incident on the spherical lens 11 from an exposed surface of the spherical lens 11. The light ray L1 that is incident on the spherical lens 11 is reflected by the reflection surface 12*a* of the reflection layer 12, diffused by the diffusion layer 13 in a constant angular range and emitted from the spherical lens 11.

If the light ray L1 is not diffused by the diffusion layer 13, a direction D2 of the light ray L1 emitted from the spherical lens 11 is parallel to a direction of the light ray L1 that is incident on the spherical lens 11. Therefore, the light ray L1 emitted from the spherical lens 11 returns to the projector 2 or its vicinity.

In the present embodiment, the light ray L1 emitted from the spherical lens 11 returns to a region in a constant range around the projector 2 when the light ray L1 is diffused by the diffusion layer 13. In this case, diffusion performance of the diffusion layer 13 is adjusted such that the light ray L1 returns to the entire viewing region 52*a*.

For example, the diffusion layer 13 is configured such that the light ray L1 is diffused in a vertical direction in a first angular range, and is configured such that the light ray L1 is diffused in a horizontal direction in a second angular range that is larger than the first angular range. Thus, even in the case where the angular range of the viewing region 52*a* in the horizontal direction is larger than the angular range of the viewing region 52*a* in the vertical direction, the light ray L1 reflected and diffused by the retroreflective element 1*a* returns to the entire viewing region 52*a*.

In this manner, the light ray group emitted from each projector 2 is reflected and diffused by the plurality of retroreflective elements 1*a* and returns to the corresponding viewing region 52*a*. Thus, a plurality of images that can be respectively viewed from the plurality of viewing regions 52*a* are displayed on the reflector 1 (on the field 51).

The plurality of retroreflective elements 1*a* may be respectively and independently arranged or integrated as a module. In the case where the plurality of retroreflective elements 1*a* are respectively and independently arranged, the plurality of retroreflective elements 1*a* are laid by being scattered on the field 51, for example. Thus, the plurality of retroreflective elements 1*a* can be easily disposed on the field 51. Further, when the plurality of laid retroreflective elements 1*a* are collected, it is possible to suck up the plurality of retroreflective elements 1*a* by using a vacuum cleaner, for example. On the other hand, in the case where the plurality of retroreflective elements 1*a* are integrated as a module, the reflector 1 is divided into a plurality of regions, and each region is constituted by a module including the plurality of retroreflective elements 1*a*, for example. Each module may be formed by integration of the plurality of retroreflective elements 1*a* on a sheet that can be rolled up, or may be formed by integration of the plurality of retroreflective elements 1*a* on a panel. In this case, it is possible to easily dispose the plurality of retroreflective elements 1*a* on the field 51 by laying the plurality of modules on the field 51.

Because the reflector 1 is made of the retroreflective material, even in the case where an image display surface that is not flat is used, an image is prevented from being displayed in a distorted manner. For example, the plurality of retroreflective elements 1*a* are laid on a lawn that is not flat or a surface of water in a pool. In this case, because an image is prevented from being displayed in a distorted manner, a viewer can view the image without an uncomfortable feeling.

The reflector 1 preferably reflects and diffuses each light ray group such that light rays emitted from the plurality of projectors 2 corresponding to the different viewing regions 52*a* are not directed towards the same viewing regions 52*a*. In this case, a plurality of images corresponding to the different viewing regions 52a are prevented from being viewed from the same viewing regions 52a.

Further, adjacent viewing regions 52a may be spaced apart from each other such that the light rays from the plurality of projectors 2 corresponding to the different viewing regions 52a are not directed towards the same viewing regions 52a. In this case, a passage may be provided between the adjacent viewing regions 52a, or seats for the audience between the adjacent viewing regions 52a may be prevented from being used.

(3) Display of Images

In the present embodiment, the plurality of projectors 2 emit light ray groups showing images that are different from one another. Thus, different images are viewed from different viewing regions 52a.

Figure 4A:
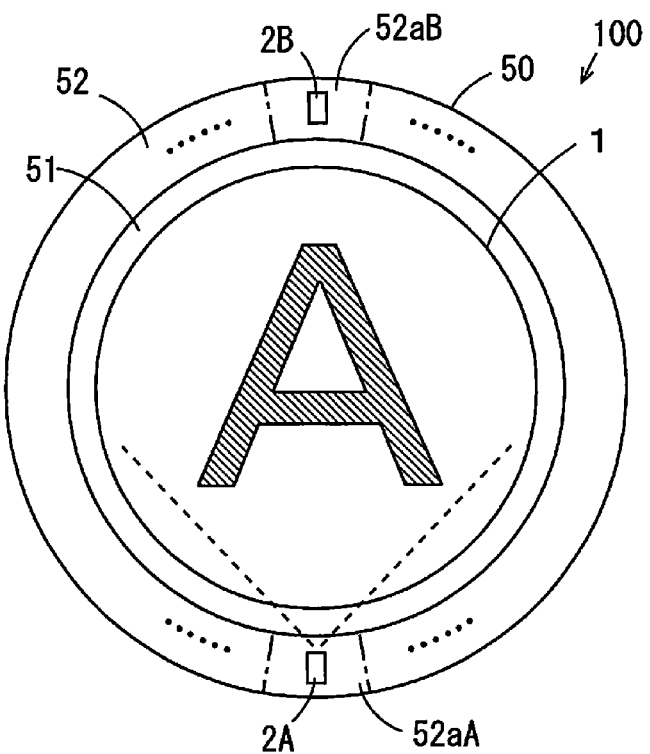
FIGS. 4A and 4B are plan views for explaining images viewed from different viewing regions.
Figure 4B:
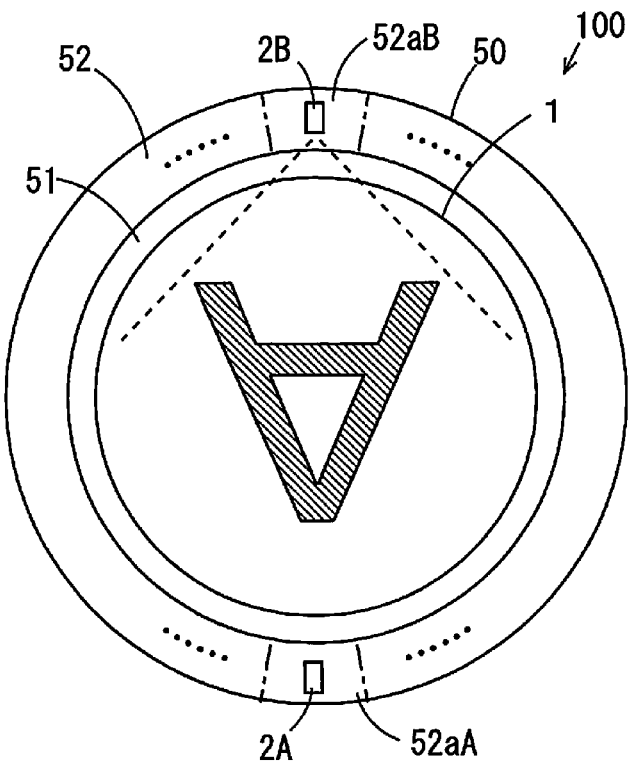
Figure 5A:
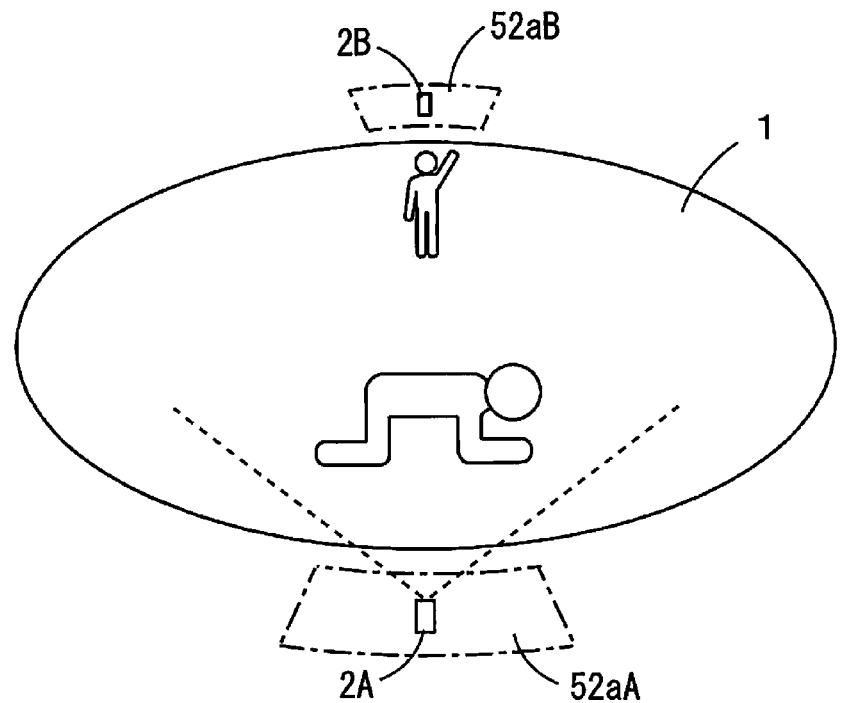
FIGS. 5A and 5B are perspective views for explaining images viewed from the different viewing regions.
Figure 5B:
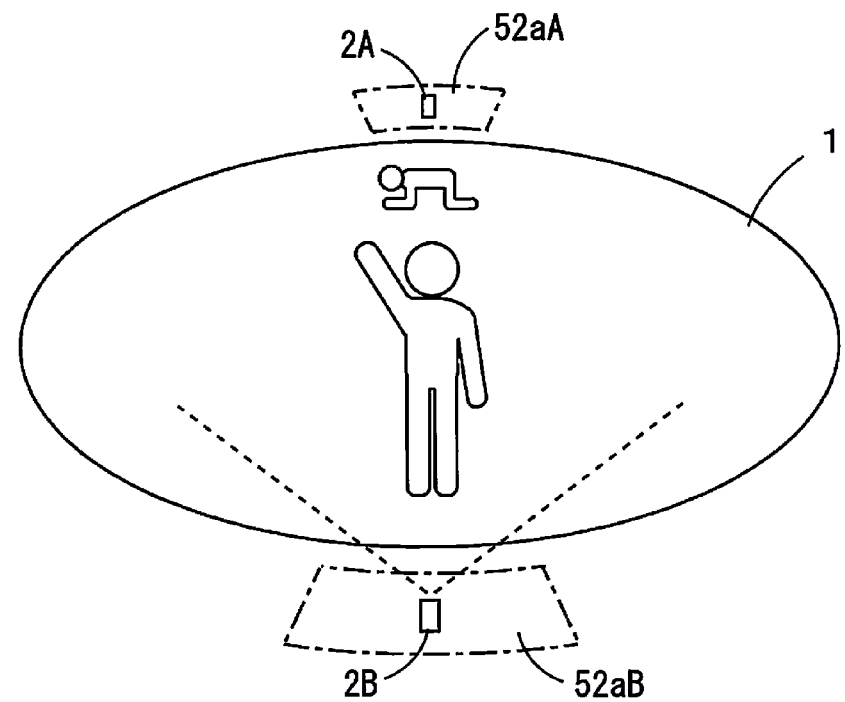

FIGS. 4A and 4B are schematic plan views for explaining images as viewed from different viewing regions 52a. FIGS. 5A and 5B are schematic perspective views for explaining images as viewed from the different viewing regions 52a. The images displayed by one projector are respectively shown in FIGS. 4A and 5A and the images displayed by another projector 2 are respectively shown in FIGS. 4B and 5B. Hereinafter, the one projector 2 of FIGS. 4A and 5A is referred to as the projector 2A, and the other projector of FIGS. 4B and 5B is referred to as the projector 2B. Further, the viewing region 52a corresponding to the projector 2A is referred to as the viewing region 52aA, and the viewing region 52a corresponding to the projector 2B is referred to as the viewing region 52aB.

As shown in FIGS. 4A and 4B, the projectors 2A, 2B are disposed to be opposite to each other with the reflector 1 interposed therebetween. In the example of FIGS. 4A and 4B, an orientation of the image displayed by the projector 2A and an orientation of the image displayed by the projector 2B are opposite to each other when seen in plan view. Therefore, an orientation of the image as viewed from the viewing region 52aA and an orientation of the image as viewed from the viewing region 52aB are the same.

In the example of FIGS. 5A and 5B, an image displayed by the projector 2A and an image displayed by the projector 2B respectively show the common three-dimensional content virtually presented on the reflector 1 (on the field 51). In this case, the image corresponding to the case where the three-dimensional content is viewed from the viewing region 52aA is displayed by the projector 2A. Further, the image corresponding to the case where the three-dimensional content is viewed from the viewing region 52aB is displayed by the projector 2B.

In this manner, the common three-dimensional content can be viewed from each viewing region 52a in a direction corresponding to the viewing region 52a. For example, a soccer match may be virtually presented on the reflector 1 as the three-dimensional content in a soccer stadium. In this case, the actual soccer match is filmed at a plurality of positions corresponding to the plurality of viewing regions 52a. The plurality of acquired images are respectively displayed on the reflector 1 by the plurality of projectors 2. Thus, the common soccer match can be viewed from each viewing region 52a in a direction corresponding to the viewing region 52a. Therefore, it is possible to feel a high sense of realism while watching the soccer match at the public viewing.

Further, a plurality of images may be displayed on the reflector 1 by the plurality of projectors 2 such that three-dimensional CG content produced by the use of a computer graphics (CG) technology is virtually presented on the reflector 1. In this case, the plurality of respectively corresponding images in the case where the CG content is viewed from the plurality of viewing regions 52a are produced. The plurality of produced images are respectively displayed on the reflector 1 by the plurality of projectors 2. Thus, the three-dimensional CG content can be observed from each viewing region 52a in a direction corresponding to the viewing region 52a.

Further, an additional image such as character information may be displayed in a superimposed manner on one selected image or a plurality of selected images among a plurality of images displayed by the plurality of projectors 2. Alternatively, additional images different from each other may be displayed in a superimposed manner on a plurality of images. For example, in the case where Japanese viewers are gathered in one viewing region 52a, and French viewers are gathered in another viewing region 52b, character information in Japanese may be displayed in a superimposed manner on the image viewed from the one viewing region 52a, and character information in French may be displayed in a superimposed manner on an image viewed from the other viewing region 52a.

Further, an audio device that generates respectively different sound for the plurality of viewing regions 52a may be provided. For example, recording is performed at a plurality of positions corresponding to the plurality of viewing regions 52a in a venue where the soccer match is actually held. The sound is output for the plurality of respective viewing regions 52a. Thus, cheering and the like at the actual venue can be heard in each viewing region 52a. Thus, a higher sense of realism can be acquired. Further, in the case where public viewing is held at a plurality of venues, the sound can be shared among the plurality of these venues. Thus, a sense of unity can be created among the plurality of venues.

(4) Other Examples of Retroreflective Element 1a

FIGS. 6A to 6D and 7 are schematic cross sectional views showing other examples of the retroreflective elements 1a. As for the retroreflective elements 1a of FIGS. 6A to 6D and 7, differences from the example of FIG. 3 will be described.

Figure 6A:
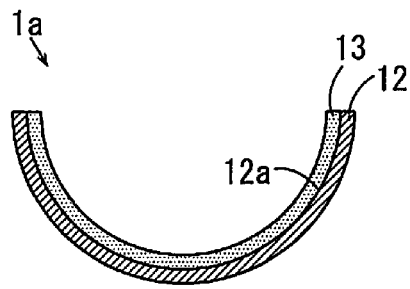
FIGS. 6A to 6D are schematic cross sectional views showing other examples of retroreflective elements.

The retroreflective element 1a of FIG. 6A does not have the spherical lens 11. Further, a reflection surface 12a of a reflection layer 12 is formed such that a direction in which a light ray arrives at the reflection surface 12a is parallel to a direction in which the light ray reflected at the reflection surface 12a is emitted. The reflection surface 12a is a parabolic curved surface, a conical surface, a polygonal surface or a polyhedral surface (a plurality of surfaces that constitute a polyhedron), for example. In the present example, a light ray group emitted from each projector 2 is reflected and diffused by the plurality of retroreflective elements 1a and returns to the corresponding viewing region 52a. In the present example, because the spherical lens 11 is not used, manufacturing can be simplified as compared to the example of FIG. 3.

Figure 6B:
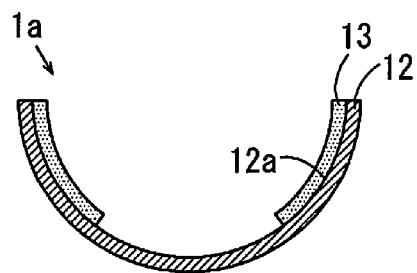

Except that the diffusion layer 13 is not provided on a bottom portion of a reflection surface 12a of the reflection layer 12, a retroreflective element 1a of FIG. 6B has the same configuration as the configuration of the retroreflective element 1a described in the example of FIG. 6A. As described above, because a light ray emitted from each projector 2 arrives from a position obliquely further upward than the retroreflective element 1a, the light ray is unlikely to reach the bottom portion of the reflection surface 12a. Therefore, even in the case where the diffusion layer 13 is not provided on the bottom portion of the reflection surface 12a, the functions similar to the functions described in the example of FIG. 6A are realized. Further, in the present example, manufacturing can be simplified similarly to the example of FIG. 6A. The light arriving from above is prevented from being reflected and diffused at the bottom portion of the reflection surface 12a and becoming stray light, so that image quality is improved.

Directions of light rays arriving at each retroreflective element 1a are different from one another depending on a positional relationship between each retroreflective element 1a and each projector 2, an angle of projection field of each projector 2 and the like. Then, arriving positions of the light rays on the reflection surface 12a may be calculated in advance based on the positional relationship between each retroreflective element 1a and each projector 2, the angle of projection field of each projector 2 and the like. A region on the reflection surface 12a on which the diffusion layer 13 is formed may be adjusted based on a result of calculation.

Figure 6C:
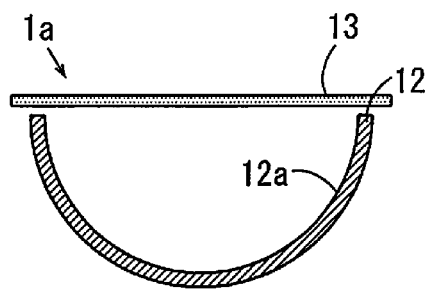

In the retroreflective element 1a of FIG. 6C, a diffusion layer 13 is not provided on a reflection surface 12a of a reflection layer 12, but a plate-shape or a sheet-like diffusion layer 13 is provided to cover a space surrounded by the reflection surface 12a. Also in the present example, a light ray emitted from each projector 2 is reflected by the reflection surface 12a and diffused by the diffusion layer 13 and returns to the corresponding viewing region 52a. However, in the present example, the light ray is likely to be diffused in a wide range as compared to the examples of FIGS. 6A and 6B. Therefore, it is necessary to accurately adjust the diffusion performance of the diffusion layer 13, the shape of the reflection surface 12a and the like such that the light ray returns to the corresponding viewing region 52a. In the present example, because one diffusion layer 13 can be used for a plurality of retroreflective elements 1a, manufacturing can be further simplified.

Figure 6D:
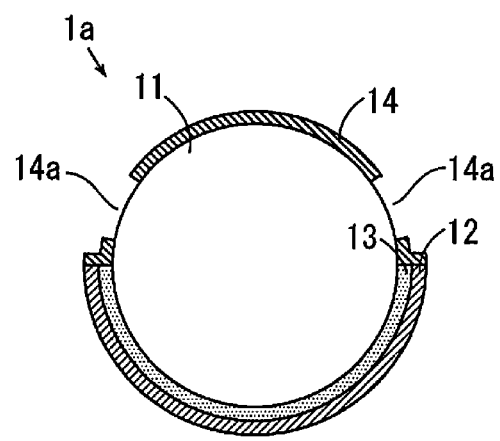

In a retroreflective element 1a of FIG. 6D a light-blocking film 14 is formed to cover an outer surface of a spherical lens 11 except for an annular opening region 14a. A light ray emitted from each projector 2 is incident on the spherical lens 11 through the opening region 14a. The light reflected and diffused by the reflection surface 12a and the diffusion layer 13 is emitted towards a corresponding viewing region 52a through the opening region 14a. In the present example, external light such as sunlight, stray light and the like are blocked by the light-blocking film 14. Thus, an image displayed by each projector 2 is clearer.

Similarly to the example of FIG. 6B a direction of a light ray that arrives at each retroreflective element 1a is different depending on a positional relationship between each retroreflective element 1a and each projector 2, the angle of projection field of each projector 2 and the like. An incidence position of the light ray on the spherical lens 11 may be calculated based on the positional relationship between each retroreflective element 1a and each projector 2, the angle of projection field of each projector 2 and the like. An emission position of the light ray from the spherical lens 11 may be calculated. Then, a position, a size and the like of the opening region 14a may be adjusted based on these results of calculation. In this case, the light ray emitted from each projector 2 and the light ray that is to return to each viewing region 52a are prevented from being blocked by the light-blocking film 14.

FIG. 7 shows one example of a technique of forcibly adjusting an attitude of the retroreflective element 1a of FIG. 3. In the retroreflective element 1a of FIG. 7, a weight 15 is provided on a lower surface of the reflection layer 12. For example, in the case where a plurality of retroreflective elements 1a are respectively provided as independent objects, an attitude of each retroreflective element 1a is naturally adjusted by the weight 15 such that the exposed surface of the spherical lens 11 is directed upward. Further, a layer of water is formed on the field 51 of FIG. 1, for example, and a plurality of retroreflective elements 1a are disposed to float on the layer of water. In this case, the exposed surface of the spherical lens 11 is directed upward when the weight 15 sinks downward. The image display apparatus 100 may be allowed to work in that state. Alternatively, each retroreflective element 1a may be disposed on the field 51 such that the exposed surface of the spherical lens 11 is directed upward when the water on the field 51 is removed. Then, the image display apparatus 100 may be allowed to work in that state.

In the example of FIG. 7, a magnet may be used instead of the weight. In this case, the attitude of each retroreflective element 1a can be more easily and accurately adjusted. Further, even in the case where the retroreflective element 1a is disposed on a surface that is not horizontal, the attitude of each retroreflective element 1a can be easily adjusted.

The plurality of configurations shown in FIGS. 3, 6 and 7 may be put together. For example, in the retroreflective element 1a of FIG. 3, 6D or 7, part of the diffusion layer 13 does not have to be provided as in the example of FIG. 6B. Further, in the retroreflective element 1a of FIG. 3, 6D or 7, the diffusion layer 13 of FIG. 6C may be provided. Alternatively, in each of the retroreflective elements 1a of FIGS. 6A to 6D the weight 15 of FIG. 7 may be provided.

Further, a corner reflector may be used as a retroreflective element 1a. Further, the plurality of configurations shown in FIGS. 3, 6A to 6D, and 7 may be put together with the corner reflector. For example, the diffusion layer 13 of FIG. 3 may be provided on a reflection surface of the corner reflector, and the light-blocking film 14 of FIG. 6D may be provided to cover part of the reflection surface of the corner reflector.

(5) Pixel Pitch and Number of Pixels

As described above, the light ray emitted from each projector 2 is equivalent to a pixel of the image displayed on the reflector 1. Hereinafter, a distance between centers of each set of adjacent two pixels is referred to as a pixel pitch. In the case where the pixel pitch is large (the resolution is low), a viewer feels that an image is rough and unclear. Then, the pixel pitch is set such that the viewer can view the image without an uncomfortable feeling.

Figure 8:
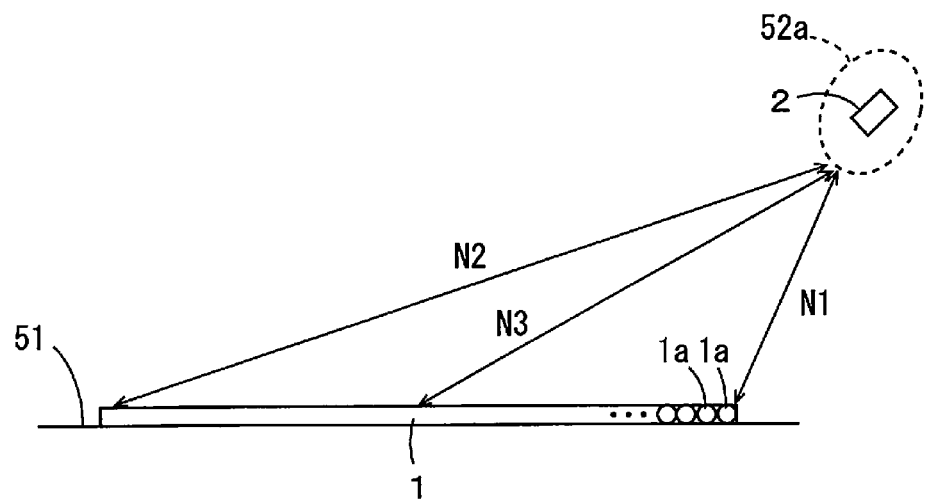
FIG. 8 is a schematic side view for explaining a pixel pitch and the number of pixels of an image displayed by a projector.
Figure 9:
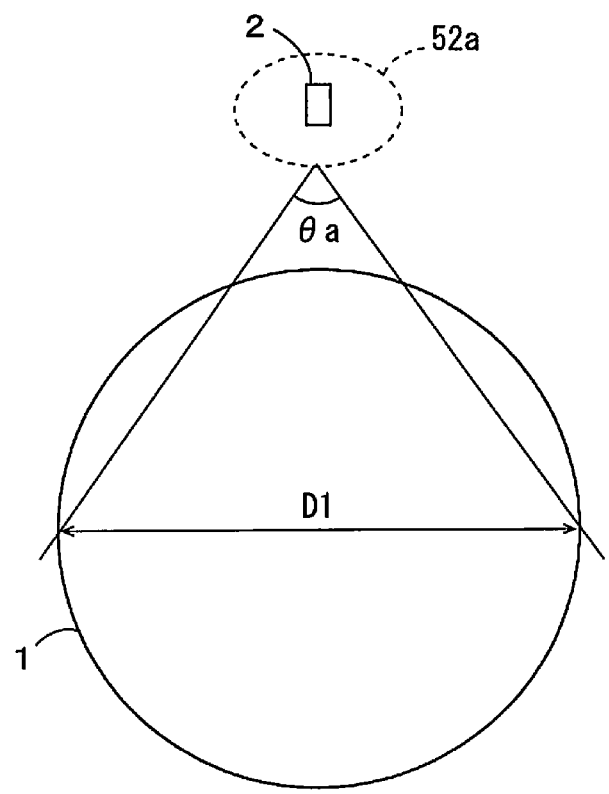
FIG. 9 is a schematic plan view for explaining the pixel pitch and the number of pixels of the image displayed by the projector.

FIGS. 8 and 9 are a schematic side view and a schematic plan view for explaining the pixel pitch and the number of pixels of an image displayed by the projector 2. In the FIGS. 8 and 9, only one viewing region 52a is shown.

In FIG. 8, let a minimum distance between the viewing region 52a and the reflector 1 be N1. Specifically, the distance N1 is a distance between a viewer who is in the front row in the viewing region 52a and a retroreflective element 1a that is the closest to the viewer, for example. Further, let resolution of a visual angle of a viewer having average eyesight be $\theta$ (radian). The resolution A may be determined in advance to be a constant value. For example, in the case where the eyesight of the viewer is 1.0, the resolution A of the visual angle is about 0.000291 radian (1/60 degree). The pixel pitch is preferably set smaller than $d1=N1 \cdot \theta$.

d1 is a lower limit dimension with which the viewer having the average eyesight (1.0, for example) can visually recognize a subject from a position spaced apart from the subject by a distance N1. Therefore, almost all of the viewers in each viewing region 52a can visually recognize the image displayed on the reflector 1 without an uncomfortable feeling when the image pitch is set smaller than the dimension d1.

For example, in the case where the distance N1 is 53 m, and the resolution A of the visual angle of the viewer is 0.000291 radian, the dimension d1 is about 1.54 cm. In this case, the pixel pitch is preferably set smaller than 1.54 cm.

A pitch of the retroreflective element 1a is preferably equal to the pixel pitch or smaller. The pitch of the retroreflective element 1a is a distance between centers of each set of two adjacent retroreflective elements 1a. In the case where a plurality of retroreflective elements 1a are densely disposed, the pitch of the retroreflective element 1a is substantially equal to a dimension of the retroreflective element 1a in the horizontal direction (a diameter). The pitch of the retroreflective element 1a is preferably smaller than the above-mentioned dimension d1 and is more preferably ½ of the dimension d1 or smaller.

In FIG. 8, let a maximum distance between the viewing region 52a and the reflector 1 be N2. The distance N2 is a distance between the viewer in the front row in the viewing region 52a and a retroreflective element 1a that is the farthest from the viewer, for example. Further, let a distance between the viewing region 52a and the center of the reflector 1 be N3.

In this case, a lower limit dimension with which a viewer having the average eye sight (1.0, for example) can visually recognize a subject from a position spaced apart from the subject by the distance N2 is represented by $d2=N2 \cdot \theta$. A lower limit dimension with which the viewer having the average eye sight (1.0, for example) can visually recognize a subject from a position spaced apart from the subject by the distance N3 is represented by $d3=N3 \cdot \theta$. For example, in the case where the distance N2 is 176 m, the distance N3 is 102 m, and the resolution A of the visual angle of the viewer is 0.000291 radian, the dimension d2 is about 5.12 cm, and the dimension d3 is about 2.97 cm.

In this manner, the lower limit dimension value with which the viewer in the viewing region 52a can visually recognize a subject is different depending on a position on the reflector 1. Therefore, the pitch of the retroreflective element 1a may be different depending on a position on the reflector 1. However, as for the pitch of the retroreflective element 1a, it is necessary to consider not only one viewing region 52a but also all of the viewing regions 52a. In the present example, the pitch of the retroreflective element 1a can be maximized in the center portion of the reflector 1. For example, an upper limit value of the pitch of the retroreflective element 1a in the center portion of the reflector 1 is a dimension d3 (about 2.97 cm, for example) that is found from the distance N3 of FIG. 8. The closer a position is to an outer periphery of the reflector 1, the smaller a preferable upper limit value of the pitch of the retroreflective element 1a is.

Further, the pixel pitch may be different depending on a position on the reflector 1. As described above, an image displayed by one projector 2 is only viewed from the viewing region 52a corresponding to the projector 2. Therefore, as for the pixel pitch, only one viewing region 52a may be considered. For example, the upper limit value of the pixel pitch at a position on the center portion of the reflector 1 is the dimension d3 (about 2.97 cm, for example) that is found from the distance N3 of FIG. 8, and the upper limit value of the pixel pitch at the farthest position on the reflector 1 from the viewing region 52a is the dimension d2 (about 5.12 cm, for example) that is found from the distance N2 of FIG. 8.

The necessary number of pixels are found based on the pixel pitch set as described above. As shown in FIG. 9, let a diameter of the reflector 1 be D1. In the case where the pixel pitch is constant, and an image is displayed on the entire reflector 1, the maximum necessary number of pixels in the horizontal direction is a value that is found in the case where the diameter D1 is divided by the pixel pitch (D1/pixel pitch). For example, in the case where the pixel pitch is set smaller than 1.54 cm as described above, and the diameter D1 is 150 m, the maximum necessary number of pixels in the horizontal direction is larger than about 9726 pixels.

Further, the number of pixels in the horizontal direction can also be found based on an angle of view of the viewer. For example, in FIG. 9, let an angle of view of the viewer in a diametrical direction of the reflector 1 be θa. In this case, the necessary number of pixels in the diametrical direction of the reflector 1 is represented by θa/θ. For example, in the case where the angle of view θa is 73 degrees, and the resolution θ is ¹⁄₆₀ degree, the necessary number of pixels in the diametrical direction is 4380 pixels.

The approximate necessary number of retroreflective elements 1a is represented by a value that is found in the case where an area of the reflector 1 is divided by an area of each retroreflective element 1a. In the case where a diameter of the reflector 1 is 150 m, and a diameter of each retroreflective element 1a is 1.5 cm, the necessary number of retroreflective elements 1a is about a hundred million.

A plurality of projectors 2 may be provided for each viewing region 52a in order to realize the necessary number of pixels. In this case, each projector 2 displays part of an image (hereinafter referred to as a partial image) to be viewed by a viewer.

Figure 10:
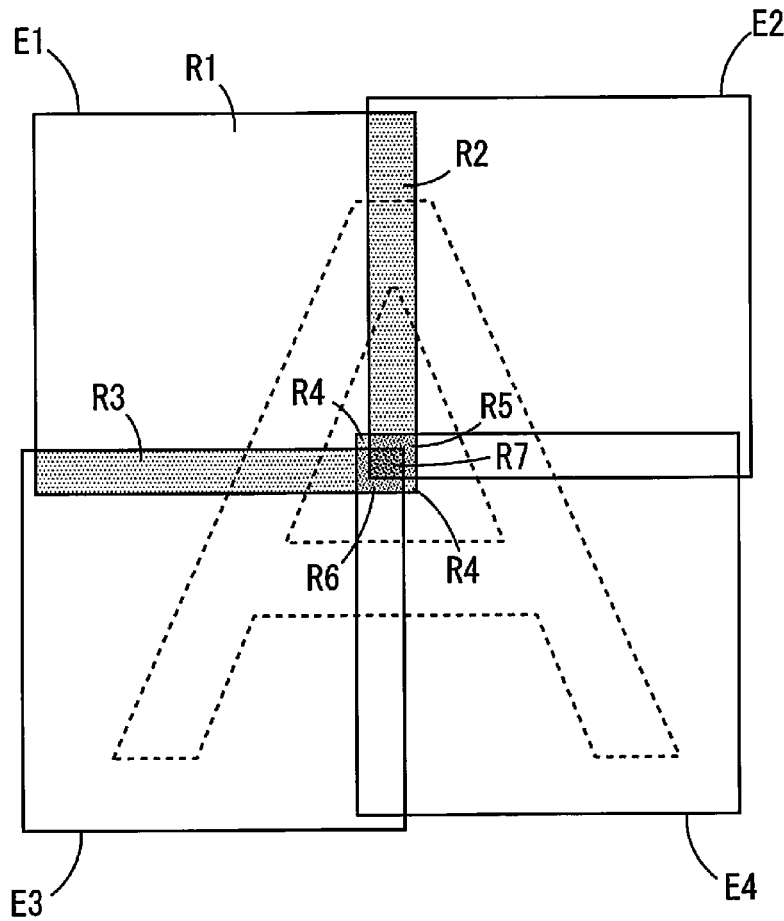
FIG. 10 is a schematic diagram for explaining coupling of partial images.

FIG. 10 is a schematic diagram for explaining the coupling of the partial images. In the example of FIG. 10, four projectors 2 are provided for one viewing region 52a. In this case, four partial images E1, E2, E3, E4 respectively displayed by the four projectors 2 are coupled to one another, whereby one image (hereinafter referred to as a coupled image) to be viewed from one viewing region 52a is formed.

As shown in FIG. 10, the partial images E1 to E4 are preferably displayed on the reflector 1 of FIG. 2 such that parts of the partial images E1 to E4 overlap with one another. In this case, an unnatural gap is prevented from being formed among the partial images E1 to E4.

Further, in each partial image, the luminance of each region of each partial image is preferably adjusted such that the luminance of a region that overlaps with another partial image is smaller than the luminance of a region that does not overlap with another partial region.

For example, in FIG. 10, a region R1 of the partial image E1 does not overlap with any of the other partial images E2, E3, E4. A region R2 of the partial image E1 overlaps with only the partial image E2, a region R3 overlaps with only the partial image E3, and a region R4 overlaps with only the partial image E4. A region R5 of the partial image E1 overlaps with the partial images E2, E4, and a region R6 overlaps with the partial images E3, E4. A region R7 of the partial image E1 overlaps with the partial images E2, E3, E4.

In this case, the luminance of each of the region R2, R3, R4 is set smaller than the luminance of the region R1, the luminance of each of the regions R5, R6 is set smaller than the luminance of each of the regions R2, R3, R4, and the luminance of the region R7 is set smaller than the luminance of each of the regions R5, R6. In this manner, the luminance of each region of each partial image is adjusted according to the overlapping of each region with other partial images, whereby a viewer can view the coupled image without an uncomfortable feeling.

(6) Control System

Figure 11:
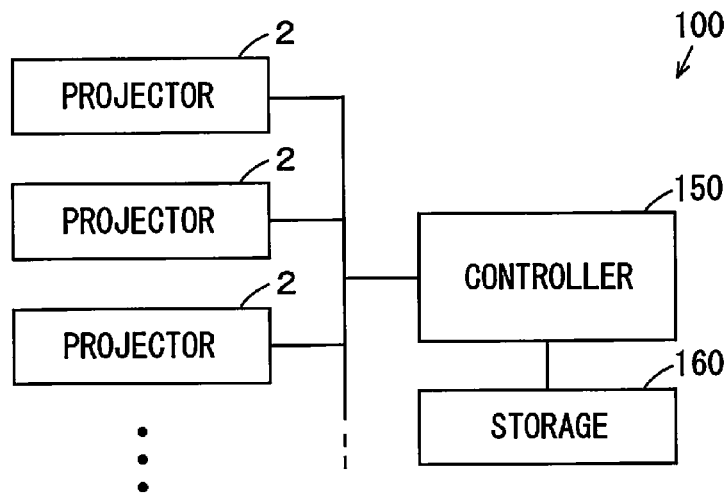
FIG. 11 is a block diagram for explaining a control system of the image display apparatus.

FIG. 11 is a block diagram for explaining the control system of the image display apparatus 100. As shown in FIG. 11, the image display apparatus 100 includes a controller 150 and a storage 160. The controller 150 includes a general purpose computer and an embedded device, for example, and controls the plurality of projectors 2 such that different images are respectively viewed from the plurality of viewing regions 52a (FIG. 2).

The storage 160 includes a storage medium such as a magnetic disc, an optical disc or a flash memory, or a main memory, for example, and stores a plurality of pieces of image data corresponding to a plurality of images to be displayed by the plurality of projectors 2. These pieces of image data may be pieces of image data that have been acquired in the past in the main stadium 50, another stadium or the like, or may be pieces of image data showing the CG content.

Further, an event held at another stadium or the like (a soccer match, for example) may be filmed, and its image data may be transmitted to the controller 150 by radio waves or communication lines in real time and be stored in the storage 160. Alternatively, the image data transmitted in this manner may be displayed by the projector 2 in real time.

Further, the image data corresponding to an additional image such as the character information may be stored in the storage 160. Such an additional image is produced in the controller 150, for example, and suitably displayed in a superimposed manner on the image displayed by the projector 2.

Further, the controller 150 may perform different types of correction on the image data. For example, in order to prevent variations of images due to individual differences of the projectors 2, a correction parameter corresponding to each projector 2 may be stored in advance in the storage 160, and the correction may be performed based on the correction parameter. Further, another correction such as distortion correction, color correction, overlapping correction or the like may be suitably performed.

(7) Effects

In the image display apparatus 100 according to the present embodiment, the light ray group emitted from each projector 2 is reflected and diffused by the reflector 1 provided on the field 51 towards the corresponding viewing region 52a. Thus, the image displayed on the field 51 can be viewed from each viewing region 52a.

Further, the plurality of projectors 2 are controlled such that different images are respectively viewed from the plurality of viewing regions 52a. Thus, each image corresponding to each viewing region 52a can be viewed from each viewing region 52a.

Further, a plurality of viewers in each viewing region 52a can simultaneously view the common image. Therefore, the necessary number of projectors 2 is smaller than the number of viewers, and an increase in cost is inhibited. Further, because it is not necessary for each viewer to wear the projector 2, a physical burden is not imposed on each viewer.

Further, in the present embodiment, because the reflector 1 is constituted by the plurality of retroreflective elements 1a, the light ray group emitted from each projector 2 is reflected and diffused by the plurality of retroreflective elements 1a and returns to the corresponding viewing region 52a. Thus, the plurality of viewers in each viewing region 52a can simultaneously view the common image with a simple configuration.

[2] Second Embodiment

Figure 12:
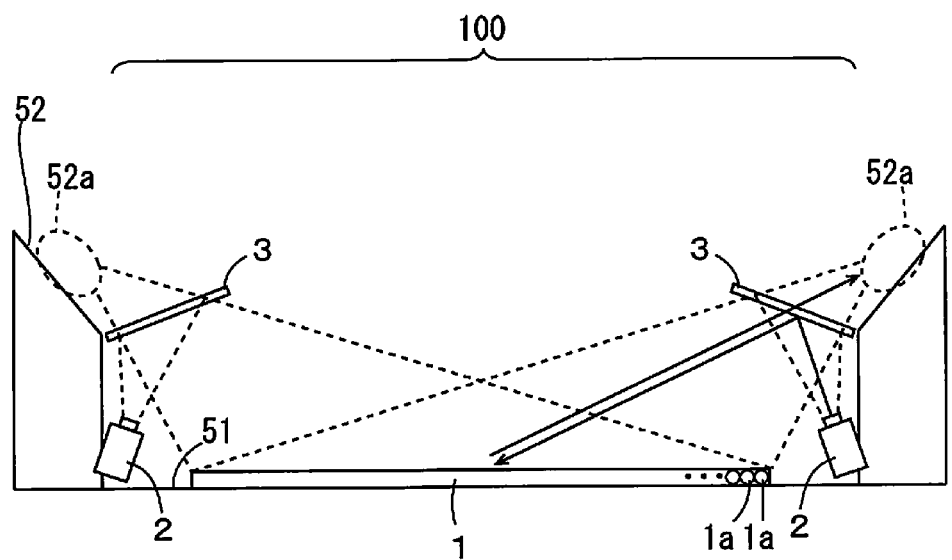
FIG. 12 is a schematic side view for explaining an image display apparatus according to a second embodiment.

As for an image display apparatus 100 according to the second embodiment of the present invention, differences from the above-mentioned first embodiment will be described. FIG. 12 is a schematic side view for explaining the image display apparatus 100 according to the second embodiment.

As shown in FIG. 12, in the present embodiment, an optical member 3 is disposed between each projector 2 and the reflector 1 on a path of a light ray. Each optical member 3 is a half mirror, for example. Each projector 2 is provided at a position different from the corresponding viewing region 52a. In the present example, each projector 2 is provided at a position further inward than the corresponding viewing region 52a and lower than the auditorium 52.

A light ray group emitted from each projector 2 is reflected by each optical member 3 and led to the reflector 1. Further, the light ray group reflected by the reflector 1 is transmitted through each optical member 3 and led to the viewing region 52a. In this case, each projector 2 is located at a conjugate position with respect to a specific position (a center position, for example) in the corresponding viewing region 52a. Thus, similarly to the first embodiment, the light ray group emitted by each projector 2 is reflected and diffused by the reflector 1 and led to the corresponding viewing region 52a. Thus, different images can be viewed from the plurality of viewing regions 52a, and a plurality of viewers in each viewing region 52a can view a common image.

Further, it is possible to suitably change a position of each projector 2 by using the optical member 3. Therefore, each projector 2 is prevented from blocking the view of the image from the viewer. Further, the light ray emitted from each projector 2 is prevented from being blocked by the viewer.

Figure 13:
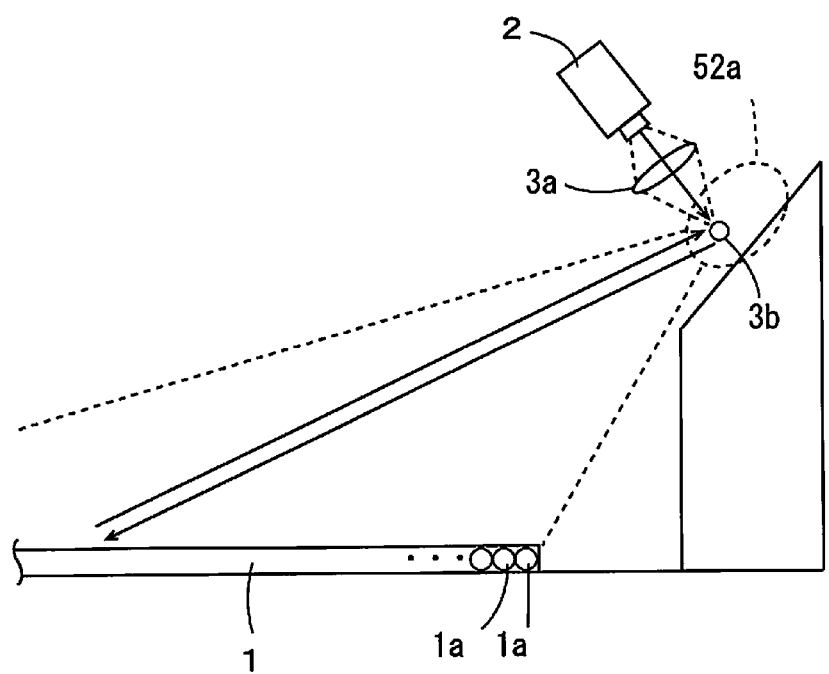
FIG. 13 is a schematic side view for explaining an example in which a lens and a small-size total reflection mirror are used.

A lens and a small-size total reflection mirror can also be used instead of the optical member 3. FIG. 13 is a schematic side view for explaining an example in which the lens and the small-size total reflection mirror are used. In FIG. 13, one projector 2, one corresponding lens and one corresponding total reflection mirror are shown. In this case, the total reflection mirror 3b is provided in each viewing region 52a. Further, the projector 2 is provided at a position higher than the auditorium 52, and the lens 3a is disposed between the projector 2 and the total reflection mirror 3b. A light ray group emitted by the projector 2 is collected by the lens 3a and reflected by the total reflection mirror 3b towards the reflector 1. Also in the present example, it is possible to change the position of each projector 2 without using a large-size optical member 3.

[3] Third Embodiment

Figure 14:
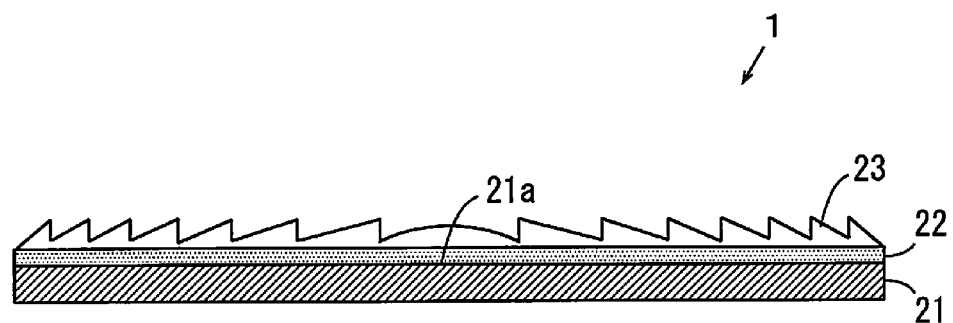
FIG. 14 is a schematic side view of a reflector used in a third embodiment.

In the third embodiment of the present invention, a reflector 1 of FIG. 14 is used instead of the plurality of retroreflective elements 1a. FIG. 14 is a schematic side view showing the configuration of the reflector 1 used in the third embodiment.

The reflector 1 of FIG. 14 includes a reflection plate 21, a diffusion layer 22 and a Fresnel lens 23. A reflection surface 21a is provided on an upper surface of the reflection plate 21, and the diffusion layer 22 and the Fresnel lens 23 are laminated on the reflection surface 21a in order. The diffusion layer 22 has the configuration similar to that of the diffusion layer 13 of FIG. 3.

Figure 15:
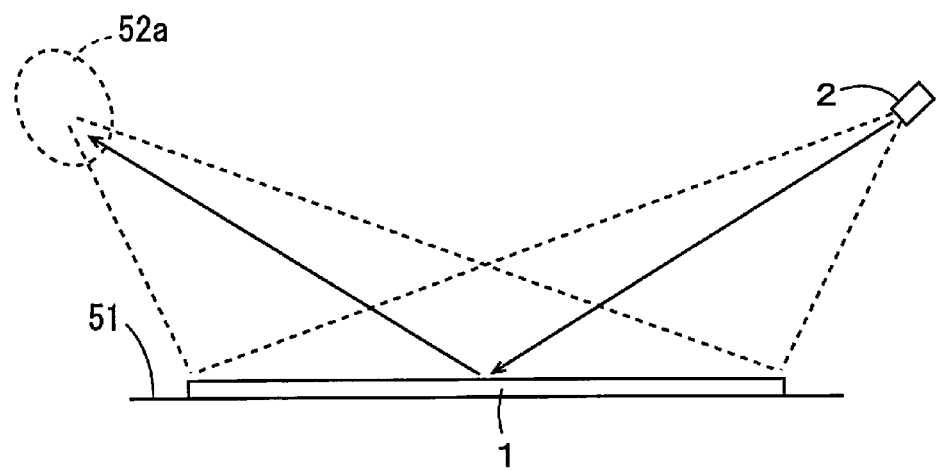
FIG. 15 is a schematic side view for explaining an effect of the reflector of FIG. 14.

FIG. 15 is a schematic side view for explaining the effect of the reflector 1 of FIG. 14 used in the third embodiment. In FIG. 15, one projector 2 and a corresponding viewing region 52a are shown. As shown in FIG. 15, a light ray group emitted by each projector 2 is reflected and diffused by the reflection plate 21 and the diffusion layer 22 of the reflector 1 and collected towards the corresponding viewing region 52a by the Fresnel lens 23. Thus, similarly to the first embodiment, different images can be viewed from the plurality of viewing regions 52a, and a plurality of viewers in each viewing region 52a can view a common image. In the third embodiment, unlike the first embodiment, the projector 2 corresponding to each viewing region 52a is disposed at a position opposite to each viewing region 52a with the reflector 1 interposed therebetween.

The Fresnel lens 23 of FIG. 14 may be divided into a plurality of sheet-like lens portions or a plurality of panel-like lens portions. In this case, it is possible to easily dispose the Fresnel lens 23 by laying the plurality of sheet-like lens portions or the plurality of panel-like lens portions on the field 51. While the diffusion layer 22 is provided between the reflection plate 21 and the Fresnel lens 23 in the example of FIG. 14, the diffusion layer 22 may be provided on the Fresnel lens 23.

[4] Other Embodiments

In the above-mentioned embodiment, the reflector 1 is provided on the horizontal field 51, and the plurality of viewing region 52a are set in the auditorium 52 provided to surround the field 51. However, the present invention is not limited to this. For example, the reflector 1 may be provided on one surface of a vertical screen, and a plurality of viewing regions 52a may be set in a region from which the one surface of the screen can be viewed. Thus, the present invention can be applied to a movie theater, a theater or the like.

Further, a surface of water in a pool can be an image display surface. As in the example of FIG. 7, it is possible to easily dispose the plurality of retroreflective elements 1a on the surface of water in the pool by providing the weights 15 at the retroreflective elements 1a. Thus, an image displayed on the surface of water in the pool can be viewed from the surroundings of the pool.

Further, the present invention may be applied to a small-scale place and not a large-scale venue such as a stadium. For example, an image display apparatus may be configured such that an upper surface of a table such as a pool table is an image display surface, and may be configured such that an image displayed on the table is viewed from its surroundings. In this case, a size of three-dimensional content such as a soccer match can be reduced and virtually presented on the table. In the case where a reflector is constituted by a plurality of retroreflective elements, and a size of the reflector and a distance from the reflector to each viewing region are reduced with a similar shape, the number of retroreflective elements is the same as the original configuration, and the dimension of each retroreflective element is set smaller than the original configuration in proportion to the reduction ratio.

While a light ray reflected by the reflector 1 is diffused by the diffusion layers 13, 22 in the above-mentioned embodiment, the present invention is not limited to this. In the case where a plurality of viewers in each viewing region 52a can simultaneously view an image, the diffusion layers 13, 22, do not have to be provided. For example, in the case where a distance between the reflector 1 and the viewing region 52a is large, each light ray reaches eyes of the plurality of viewers in the viewing region 52a due to subtle widening of each light ray. In this case, even in the case where the light ray is not diffused by the diffusion layers 13, 22, the plurality of viewers in each viewing region 52a can simultaneously view the image.

Correspondences between Constituent Elements in Claims and Parts in Preferred Embodiments In the following paragraphs, non-limiting examples of correspondences between various elements recited in the claims below and those described above with respect to various preferred embodiments of the present invention are explained.

In the above-mentioned present embodiment, the image display apparatus 100 is an example of an image display apparatus, the viewing region 52a is an example of a viewing region, the field 51 is an example of an image display surface, the projector 2 is an example of a light ray generator, the reflector 1 is an example of a reflector, the controller 150 is an example of a controller, the diffusion layer 13 is an example of a diffuser, the retroreflective element 1a is an example of a retroreflective element, the reflection surface 21a is an example of a reflection surface, and the Fresnel lens 23 is an example of a lens.

As each of constituent elements recited in the claims, various other elements having configurations or functions described in the claims can be also used.

INDUSTRIAL APPLICABILITY

The present invention can be effectively utilized in the case where a plurality of persons simultaneously view an image such as public viewing.

The invention claimed is:

1. An image display apparatus that displays images, which are respectively viewable from a plurality of viewing regions set in advance, on an image display surface, comprising:
a plurality of light ray generators that are provided to respectively correspond to the plurality of viewing regions and each emit a light ray group including a plurality of light rays towards the image display surface;
a reflector that is provided at the image display surface and reflects the plurality of light ray groups emitted from the plurality of light ray generators;
a diffuser that is provided at the image display surface and diffuses each light ray reflected by the reflector; and
a controller that controls the plurality of light ray generators, wherein
the reflector reflects a light ray group emitted from each light ray generator towards a corresponding viewing region,
the diffuser diffuses each light ray in a vertical direction in a first angular range and in a horizontal direction in a second angular range that is larger than the first angular range such that a plurality of viewers in each viewing region are capable of simultaneously viewing a common image displayed on the image display surface, and
the controller controls the plurality of light ray generators such that different images are respectively viewed from the plurality of viewing regions.

2. The image display apparatus according to claim 1, wherein
the reflector includes a retroreflective material.

3. The image display apparatus according to claim 2, wherein
the retroreflective material includes a plurality of retroreflective elements, which are arranged on the image display surface and respectively have reflection surfaces.

4. The image display apparatus according to claim 1, wherein
- the reflector includes a reflection surface that reflects the plurality of light ray groups emitted from the plurality of light ray generators, and
- a lens that collects the plurality of light ray groups reflected by the reflection surface in respective corresponding viewing regions.

5. The image display apparatus according to claim 1, wherein
- the different images include a plurality of two-dimensional images corresponding to the case where common three-dimensional content is viewed from the plurality of respective viewing regions.

6. The image display apparatus according to claim 5, wherein
- the plurality of viewing regions are set in an auditorium of a stadium, the image display surface is a horizontal field of the stadium and the common three-dimensional content is a subject to be viewed from surroundings by a number of persons.

* * * * *